June 28, 1955  S. L. BRADLEY  2,712,107
EXCITATION SYSTEMS
Filed Dec. 22, 1951

WITNESSES:
John E. Hensley
K. W. Thomas

INVENTOR
Schuyler L. Bradley.
BY
ATTORNEY

United States Patent Office 2,712,107
Patented June 28, 1955

2,712,107

EXCITATION SYSTEMS

Schuyler L. Bradley, Pittsburgh, Pa., assignor to Westinghouse Electric Corporation, East Pittsburgh, Pa., a corporation of Pennsylvania Application December 22, 1951, Serial No. 262,972

7 Claims. (Cl. 322—25)

This invention relates to excitation systems for alternating current generators and, in particular, to static excitation systems.

Many types of excitation systems have been provided in the past for alternating current generators. In those systems which have heretofore employed a base excitation, the base excitation has been decreased by an increase in the voltage appearing across the generator field winding, thus affecting the magnitude of the output voltage of the generator. In the past, in order to overcome this difficulty, elaborate regulating systems have been utilized so as to maintain the output voltage of the generator substantially constant. It is, therefore, desirable to provide an inexpensive base excitation system that is unaffected by changes in voltage across the field winding of the generator.

An object of this invention is to provide a new and improved excitation system for a generator by supplying a base excitation for the generator field winding which is substantially unaffected by changes in voltage thereacross.

Another object of this invention is to provide a new and improved excitation system having a saturable reactor for supplying a base excitation for the field winding of a generator so that the base excitation is substantially unaffected by changes in voltage across the generator field winding.

Still another object of this invention is to provide, in an excitation system, new and improved means for building up the voltage of a generator having a field winding by applying substantially all the residual voltage of the generator across the field winding on first starting up the generator and then gradually decreasing the applied voltage to zero magnitude once the generator voltage has reached a predetermined value.

A further object of this invention is to provide in an excitation system, new and improved means for building up the voltage of a generator having a field winding by so disposing an impedance network that substantially all the residual voltage of the generator appears across the field winding on first starting up the generator but after the generator voltage has reached a predetermined value, substantially all the residual voltage appears across the impedance network.

Figure 1:
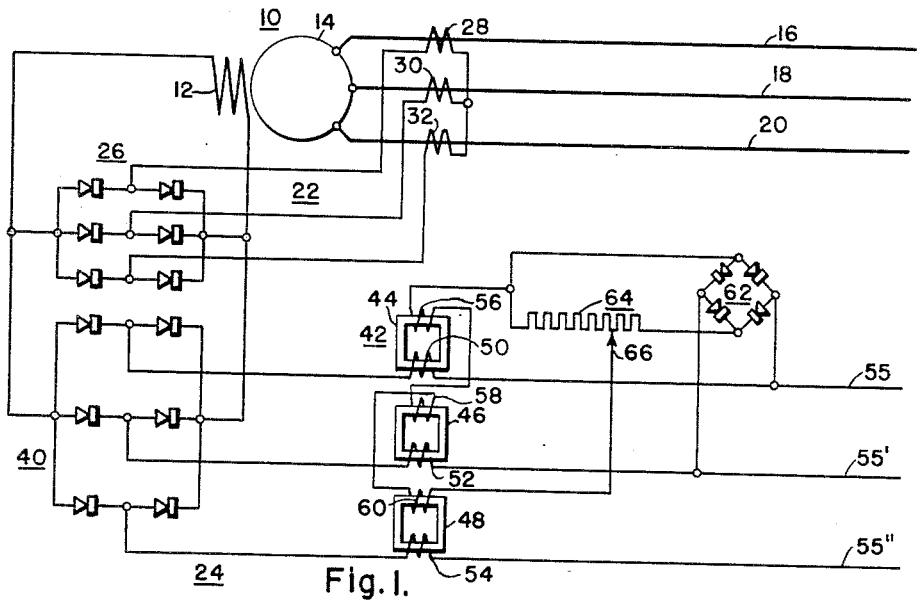
Figure 2:
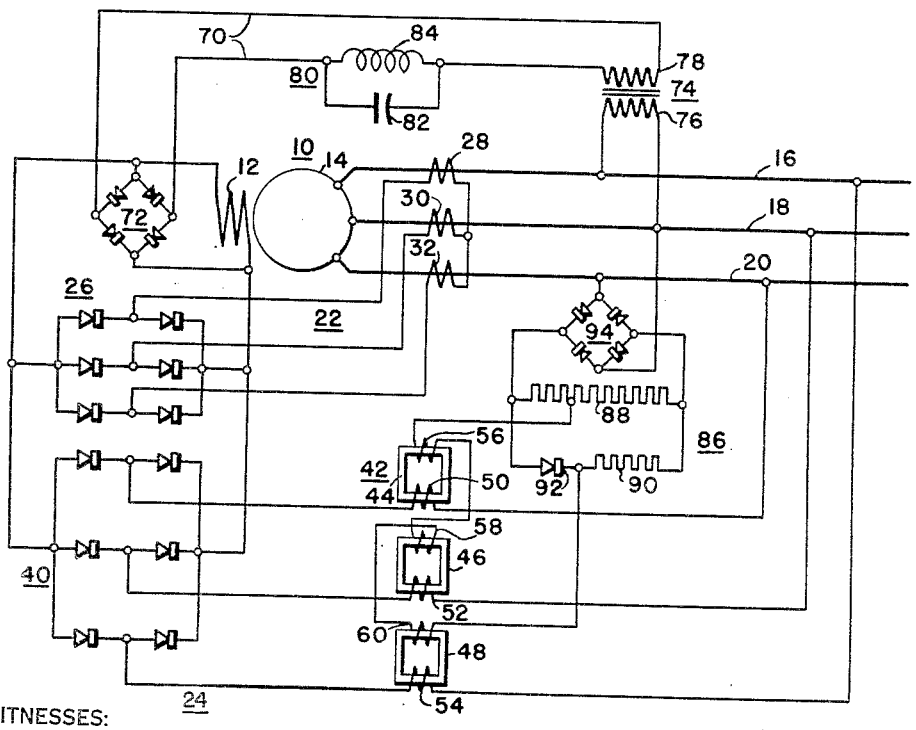

Other objects of this invention will become apparent from the following description when taken in conjunction with the accompanying drawing, in which:

Figure 1 is a schematic diagram of circuits and apparatus of an embodiment of the teachings of this invention, and Fig. 2 is a schematic diagram of circuits and apparatus of another embodiment of the teachings of this invention.

Referring to Fig. 1 of the drawing, there is illustrated an excitation system for a three-phase alternating current generator 10. In this instance the generator 10 comprises a field winding 12 and armature windings 14 which are disposed to supply alternating current energy to load conductors 16, 18 and 20.

The excitation system for the generator 10 comprises, in general, a current responsive excitation system 22 responsive to the current flow through the load conductors 16, 18 and 20, and a base excitation system 24 which is disposed to supply a substantially constant rectified three-phase current to the field winding 12 of the generator 10. The excitation system 22 is provided in order to supply a portion of the excitation for the field winding 12 of the generator 10 when the generator is under load and also to maintain the output voltage of the generator 10 substantially constant when the generator is operating at a lagging power factor.

In this instance the excitation system 22 comprises a three-phase dry-type rectifier 26 having input and output terminals, the output terminals being electrically connected across the field winding 12 of the generator 10. The input terminals of the three-phase rectifier 26 are connected to three current transformers 28, 30 and 32 which are inductively associated with the load conductors 16, 18 and 20, respectively, so as to be responsive to the flow of current therethrough. Thus, the excitation system 22 functions to produce a voltage across the field winding 12 that is proportional to the current flow through the load conductors 16, 18 and 20.

In order to provide a basic excitation for the generator 10 that is unaffected by changes in voltage across the field winding 12, as produced in this instance by the excitation system 22, the base excitation system 24 is provided. In this instance the base excitation system 24 comprises, in general, a three-phase dry-type rectifier 40 having input and output terminals, the output terminals being electrically connected across the field winding 12 of the generator 10. The base excitation system 24 also comprises, in general, a simple saturable reactor 42 of the non-self-saturating type which is disposed to supply three-phase alternating current energy to the input terminals of the rectifier 40.

As illustrated, the saturable reactor 42 comprises three magnetic core members 44, 46 and 48 having disposed thereon in inductive relation alternating current windings 50, 52 and 54, respectively. In this embodiment the alternating current windings 50, 52 and 54 are disposed to receive substantially constant three-phase alternating current energy from a separate alternating current source (not shown) through line conductors 55, 55' and 55". The alternating current windings 50, 52, and 54 are also electrically connected to the input terminals of the rectifier 40.

In order to saturate the core members 44, 46 and 48 a predetermined amount, control windings 56, 58 and 60 are connected in series circuit relation with one another and are disposed in inductive relation around the core members 44, 46 and 48, respectively. For the purpose of providing direct current energy for the control windings 56, 58 and 60, a full wave dry type rectifier 62 having input and output terminals is disposed with the input terminals thereof electrically connected across the line conductors 55 and 55'. In order that the magnitude of the direct current flow through the series-connected control windings 56, 58 and 60 may be varied, a variable resistance member 64 is electrically connected across the output terminals of the rectifier 62. The variable resistance member 64 comprises a slidable contact member 66, to which one end of the series-connected control windings 56, 58 and 60 is connected. The other end of the series-connected control windings 56, 58 and 60 is connected to one end of the resistance member 64.

When first putting the apparatus of Fig. 1 into operation, the base excitation system 24 is adjusted by means of the slidable contact member 66 so as to produce the desired rated output voltage for the generator 10 at no load. The desired rated output voltage can thus be obtained since the control windings 56, 58 and 60 are disposed in inductive relation with the core members 44, 46 and 48, respectively, and a change in current flow therethrough, as brought about by a re-positioning of the contact member 66, effects a change in the saturation of the core members 44, 46 and 48, respectively. The change in saturation of the core members 44, 46 and 48 affects the impedance of the alternating current windings 50, 52 and 54 and therefore the magnitude of the alternating current flow to the rectifier 40 and thus the direct current flow through the field winding 12 of the generator 10. In fact, the only way in which the magnitude of the alternating current flow to the rectifier 40 can be varied is by changing the position of the contact member 66. Such being the case, once the contact member 66 is positioned, the alternating current flow to the rectifier 40 will be substantially constant and the basic excitation supplied thereby, which appears at the output terminals of the rectifier 40, will be unaffected by any change in voltage across the field winding 12 of the generator 10 as produced for instance by the excitation system 22.

Referring to Fig. 2 there is illustrated another embodiment of the teachings of this invention. Like components of the apparatus of Figs. 1 and 2 are given the same reference characters. In the embodiment shown in Fig. 2, the saturable reactor 42 receives its alternating current energy from the output of the generator 10 rather than from a separate source of alternating current energy as was the case with the apparatus of Fig. 1.

In order to partially build up the alternating current voltage of the generator 10 on starting, a static electrical circuit 70 is provided. The electrical circuit 70 comprises a full-wave dry-type rectifier 72 having input and output terminals, the output terminals being electrically connected across the field winding 12 of the generator 10. A potential transformer 74 having a primary winding 76 and a secondary winding 78 has its primary winding 76 electrically connected across the load conductors 16 and 18 so as to produce a measure of the output voltage of the generator 10 across the secondary winding 78. In order to produce a voltage across the input terminals of the rectifier 72 in accordance with the magnitude of the voltage appearing across the load conductors 16 and 18, an impedance network 80, comprising a capacitor 82 and a saturating reactor 84 connected in parallel circuit relation, is connected in circuit relation with the input terminals of the rectifier 72 and the secondary winding 78 of the transformer 74. In particular, the impedance network 80 is such that on first starting up the generator 10, substantially all of the residual voltage of the generator 10, after once having been stepped up by the transformer 74, appears across the input terminals of the rectifier 72. As the voltage of the generator 10 increases, a smaller voltage appears across the input terminals of the rectifier 72 until at a predetermined output voltage of the generator 10, substantially all the voltage appears across the impedance network 80 and none across the input terminals of the rectifier 72 since at this predetermined output voltage, the characteristic of the parallel-connected capacitor 82 and saturating reactor 84 is such as to offer a substantially infinite impedance to the flow of current. Therefore, the capacitor 82 and saturating reactor 84 as connected actually constitute a resonant circuit.

In order to supply three-phase alternating current energy to the rectifier 40, shown in Fig. 2, one end of each of the alternating current windings 50, 52, and 54 of the saturable reactor 42 is electrically connected to the load conductors 20, 18 and 16, respectively. The other end of each of the windings 50, 52 and 54 is electrically connected to the rectifier 40. However, for the purpose of producing a direct current flow through the series-connected control windings 56, 58 and 60 which steadily increases to a predetermined amount and then decreases, a Wheatstone bridge 86, having input and output terminals, is provided. In this instance, the Wheatstone bridge 86 comprises resistance members 88 and 90, and a one-way rectifier 92 which has a constant voltage drop thereacross irrespective of the magnitude of the current flow therethrough. In order to provide direct current voltage across the input terminals of the Wheatstone bridge 86, a full-wave dry-type rectifier 94 having input and output terminals is provided. The input terminals of the rectifier 94 are electrically connected across the load conductors 18 and 20, whereas, the output terminals of the rectifier 94 are electrically connected to the input terminals of the Wheatstone bridge 86. As can be seen from the drawing, the output terminals of the Wheatstone bridge 86 are electrically connected to the series-connected control windings 56, 58 and 60 so that the current flow through the control windings will vary in accordance with the magnitude of the voltage appearing across the output terminals of the Wheatstone bridge 86.

In operation when using the electrical circuit 70 for starting purposes, the residual voltage of the generator 10 is of sufficient magnitude once it has been stepped up by the potential transformer 74 to produce sufficient voltage across the field winding 12 to start building up the alternating current voltage. When the voltage across the load conductors 16 and 18 reaches a predetermined magnitude substantially all the output voltage from the transformer 74 appears across the impedance network 80 and substantially no current flows from the rectifier 72 through the field winding 12 of the generator 10. However, the output voltage of the generator 10 continues to increase since the output from the Wheatstone bridge 86 is still increasing and thus increasing the output current from the saturable reactor 42 and the voltage across the field winding 12 of the generator 10. The output voltage from the Wheatstone bridge 86 continues to increase until just before the output voltage of the generator 10 reaches its regulated value at which time the output voltage from the Wheatstone bridge 86 decreases since the rectifier 92 has a substantially constant voltage drop thereacross irrespective of the current flow therethrough. When the output voltage of the generator 10 is at its regulated value, the bridge 86 is still in an unbalanced state, and the current flow through the control windings 56, 58 and 60 effects a predetermined current flow through the alternating current windings 50, 52 and 54 to the output terminals of the rectifier 40 to thus maintain a predetermined base excitation for the generator 10. This base excitation, as was the case with the apparatus of Fig. 1, is unaffected by changes in voltage across the field winding 12 such as produced by the excitation system 22.

Since the control windings 56, 58 and 60 of the saturable reactor 42 are responsive to a measure of the voltage that appears across the load conductors 18 and 20, the saturable reactor 42 and the Wheatstone bridge 86 also serve as a regulator for maintaining the output voltage of the generator 10 substantially constant. For instance, if the output voltage of the generator 10 rises above its regulated value, there will be an increase in the voltage appearing across the input terminals of the Wheatstone bridge 86. The increased voltage across the input terminals of the Wheatstone bridge 86 will decrease the current flow through the control windings 56, 58 and 60, thus decreasing the saturation of the core members 44, 46 and 48, respectively. Such action increases the impedance of the alternating current windings 50, 52 and 54 and thus decreases the magnitude of the alternating current flow to the rectifier 40. The decreased current flow to the rectifier 40 in turn effects a decrease in the voltage across the field winding 12, thus returning the output voltage of the generator 10 to its regulated value.

However, assuming the output voltage of the generator 10 falls below its regulated value, there will be a decrease in the voltage appearing across the input terminals of the Wheatstone bridge 86, thus increasing the current flow through the control windings 56, 58 and 60. The increased current flow through the control windings 56, 58 and 60 increases the saturation of the core members 44, 46 and 48, respectively, thus increasing the current flow to the rectifier 40. The increased current flow to the rectifier 40 increases the voltage across the field winding 12, thus returning the output voltage of the generator 10 to its regulated value.

The excitation systems illustrated in Figs. 1 and 2 have several advantages. For instance, both of these excitation systems comprise static components which are relatively inexpensive. In addition, the excitation systems illustrated in Figs. 1 and 2 provide a base excitation that is unaffected by changes in voltage across the field winding 12 of the generator 10. Likewise, these excitation systems maintain the output voltage of the generator 10 substantially constant under most conditions.

I claim as my invention:

1. In an excitation system for a generator having a field winding, the combination comprising, a rectifier having input and output terminals, the output terminals being electrically connected across the field winding of the generator, current responsive excitation means including a current transformer responsive to the output current of the generator and connected to the input terminals of the rectifier so as to produce a voltage across the field winding that is a measure of the output current of the generator, line conductors independent of the generator, said line conductors having alternating-current energy applied thereto, another rectifier having input and output terminals, the output terminals of said another rectifier being electrically connected across the field winding of the generator, and a base excitation system for the generator comprising a simple saturable reactor of the non self-saturating type electrically connected to the input terminals of said another rectifier and disposed to be energized from said line conductors, so that the magnitude of the output current of the base excitation system is substantially unaffected by the varying voltage across the field winding of the generator as produced by the current responsive excitation means.

2. In an excitation system for a generator having a field winding, the combination comprising, current responsive excitation means comprising a rectifier having input and output terminals, the output terminals being electrically connected across the field winding of the generator, and a plurality of current transformers responsive to the output current of the generator and electrically connected to the input terminals of the rectifier so as to produce a voltage across the field winding of the generator that is a measure of the output current of the generator, another rectifier having input and output terminals, the output terminals of said another rectifier being electrically connected across the field winding of the generator, and a base excitation system for the generator comprising a simple saturable reactor of the non self-saturating type electrically connected to the input terminals of said another rectifier and disposed to be responsive to an alternating current signal, so that the magnitude of the output current of the base excitation system is substantially unaffected by the varying voltage across the field winding of the generator as produced by said current responsive excitation means.

3. In an excitation system for a generator having a field winding, the combination comprising, a three-phase rectifier having input and output terminals, the output terminals being electrically connected across the field winding of the generator, current responsive excitation means including a current transformer responsive to the output current of the generator and connected to the field winding of the generator on the output side of the three-phase rectifier so as to produce a voltage across the field winding that is a measure of the output current of the generator, and a simple three-phase saturable reactor of the non self-saturating type comprising, three magnetic core members, an alternating current winding disposed in inductive relation on each of the three magnetic core members, one end of each of the alternating current windings being disposed to be electrically connected to a three-phase source of alternating current energy and the other end of each of the alternating current windings being electrically connected to the input terminals of the three-phase rectifier, another rectifier having input and output terminals, the input terminals being disposed to be electrically connected to one phase of the three-phase source of alternating current, and a control winding disposed in inductive relation on each of the three magnetic core members, the control windings being connected in circuit relation with the output terminals of said another rectifier so as to produce a predetermined base excitation across the field winding of the generator.

4. In an excitation system for a generator having a field winding, the combination comprising, current responsive excitation means comprising a three-phase rectifier having input and output terminals, the output terminals being electrically connected across the field winding of the generator, and a plurality of current transformers responsive to the output current of the generator and electrically connected to the input terminals of the rectifier so as to produce a voltage across the field winding of the generator that is a measure of the output current of the generator, another three-phase rectifier having input and output terminals, the output terminals being electrically connected across the field winding of the generator, and a simple three-phase saturable reactor of the non self-saturating type comprising, three magnetic core members, an alternating current winding disposed in inductive relation on each of the three magnetic core members, one end of each of the alternating current windings being disposed to be electrically connected to a three-phase source of alternating current and the other end of each of the alternating current windings being electrically connected to the input terminals of said another three-phase rectifier, still another rectifier having input and output terminals, the input terminals being disposed to be electrically connected to one phase of the three-phase source of alternating current, and a control winding disposed in inductive relation on each of the three magnetic core members, the control windings being connected in circuit relation with the output terminals of said still another rectifier so as to produce a predetermined substantially constant output current from the simple three-phase saturable reactor that is substantially unaffected by the varying voltage across the field winding of the generator as produced by the current responsive excitation means.

5. In an excitation system for an alternating current generator having a field winding and being disposed to supply energy to a plurality of load conductors, the combination comprising, means for building up the generator voltage on starting, said means comprising, a rectifier having input and output terminals, the output terminals being electrically connected across the field winding of the generator, a potential transformer having a primary and second winding, the primary winding being electrically connected across two of the load conductors, and a resonant circuit connected in circuit relation with the input terminals of the rectifier and the secondary winding of the potential transformer so that when first starting up the generator substantially all the voltage across said two load conductors appears across the input terminals of the rectifier and then at a predetermined voltage across said two load conductors substantially all the voltage across said two load conductors appears across the resonant circuit.

6. In an excitation system for an alternating current generator having a field winding and being disposed to supply energy to a plurality of load conductors, the combination comprising, means for building up the generator voltage on starting, said means comprising, a rectifier having input and output terminals, the output terminals being electrically connected across the field winding of the generator, a potential transformer having a primary and secondary winding, the primary winding being electrically connected across two of the load conductors, and an impedance network, comprising a capacitor and a saturating reactor connected in parallel circuit relation, connected in circuit relation with the input terminals of the rectifier and the secondary winding of the potential transformer so that when first starting up the generator substantially all the voltage across said two load conductors appears across the input terminals of the rectifier and then at a predetermined voltage across said two load conductors substantially all the voltage across said two load conductors appears across the impedance network.

7. In an excitation system for an alternating current generator having a field winding and being disposed to supply energy to a plurality of load conductors, the combination comprising, means for building up the generator voltage on starting, said means comprising, a rectifier having input and output terminals, the output terminals being electrically connected across the field winding of the generator, a potential transformer having a primary and a secondary winding, the primary winding being electrically connected across two of the load conductors, and an impedance network connected in circuit relation with the input terminals of the rectifier and the secondary winding of the potential transformer so that when first starting up the generator substantially all the voltage across said two load conductors appears across the input terminals of the rectifier and then at a predetermined voltage across said two load conductors substantially all the voltage across said two load conductors appears across the impedance network, and a basic excitation system for the generator comprising, a three-phase rectifier having input and output terminals, the output terminals being electrically connected across the field winding of the generator, a three-phase saturable reactor comprising three magnetic core members, an alternating current winding disposed in inductive relation on each of the magnetic core members, one end of each alternating current winding being electrically connected to one of the input terminals of the three-phase rectifier and the other end of each of the alternating current windings being electrically connected to one of the load conductors, a control winding disposed in inductive relation on each of the three magnetic core members, and a Wheatstone bridge having input and output terminals and a one-way rectifier comprising one leg of the bridge across which the voltage drop is a constant, the input terminals of the bridge being electrically connected to two of the load conductors through still another rectifier, and the output terminals of the bridge being electrically connected to the control windings so that the base excitation for the generator is brought up to a predetermined magnitude and there maintained substantially constant.

References Cited in the file of this patent

UNITED STATES PATENTS

| | | |
|---|---|---|
| 2,519,650 | Hamilton | Aug. 22, 1950 |
| 2,558,572 | Logan | June 26, 1951 |
| 2,571,827 | Bradley | Oct. 16, 1951 |